(12) United States Patent
Yu

(10) Patent No.: US 10,768,456 B2
(45) Date of Patent: Sep. 8, 2020

(54) LTPS DISPLAY PANEL AND LIQUID CRYSTAL DISPLAY DEVICE

(71) Applicant: Wuhan China Star Optoelectronics Technology Co., Ltd., Wuhan (CN)

(72) Inventor: Xiaojiang Yu, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/317,546

(22) PCT Filed: Aug. 2, 2018

(86) PCT No.: PCT/CN2018/098280
§ 371 (c)(1),
(2) Date: Jan. 13, 2019

(87) PCT Pub. No.: WO2019/178996
PCT Pub. Date: Sep. 26, 2019

(65) Prior Publication Data
US 2020/0081279 A1     Mar. 12, 2020

(30) Foreign Application Priority Data

Mar. 19, 2018  (CN) .......................... 2018 1 0222648

(51) Int. Cl.
*G02F 1/1333* (2006.01)
*G02F 1/1339* (2006.01)
*G02F 1/1335* (2006.01)

(52) U.S. Cl.
CPC .......... *G02F 1/1333* (2013.01); *G02F 1/1339* (2013.01); *G02F 1/13338* (2013.01); *G02F 1/133351* (2013.01); *G02F 1/133514* (2013.01); *G02F 2001/133302* (2013.01); *G02F 2202/104* (2013.01)

(58) Field of Classification Search
CPC ............... G02F 1/1339; G02F 1/13394; G02F 1/133345; G02F 1/133305; G02F 1/1333; G02F 1/133351; G02F 2001/133302; G02F 2001/133388; G02F 2201/50;
(Continued)

(56) References Cited

U.S. PATENT DOCUMENTS

2014/0103351 A1    4/2014   Liu et al.
2016/0349559 A1*  12/2016   Woo ................... G02F 1/13338
(Continued)

FOREIGN PATENT DOCUMENTS

CN            1581423         2/2005
CN          206077836         4/2017
(Continued)

*Primary Examiner* — Angela K Davison

(57) ABSTRACT

A low temperature poly-silicon (LTPS) display panel and a liquid crystal display device include a color filter substrate, an array substrate, and a frame sealing glue. The array substrate includes a glass substrate, a functional structure layer, and a third inorganic dielectric layer. The third inorganic dielectric layer connects with the frame sealing glue, and at least a row of first anti-crack holes are formed on the third inorganic dielectric layer adjacent to the frame sealing glue. The at least a row of first anti-crack holes include a plurality of the first anti-crack holes arranged in a direction along and in parallel with the frame sealing glue.

10 Claims, 2 Drawing Sheets

(58) Field of Classification Search
CPC ....... H01J 2329/4669; H01J 2329/4686; H01J 2329/4691; H01J 51/0097; B32B 3/266
See application file for complete search history.

(56) References Cited

U.S. PATENT DOCUMENTS

2018/0067350 A1* 3/2018 Hirota .................... G02F 1/1339
2018/0226617 A1* 8/2018 Nakagawa .............. H01L 51/56

FOREIGN PATENT DOCUMENTS

| CN | 107463042 | 12/2017 |
| CN | 106200064 | 6/2019 |
| TW | 201415639 | 4/2014 |

* cited by examiner

LTPS DISPLAY PANEL AND LIQUID CRYSTAL DISPLAY DEVICE

RELATED APPLICATIONS

This application is a National Phase of PCT Patent Application No. PCT/CN2018/098280 having International filing date of Aug. 2, 2018, which claims the benefit of priority of Chinese Patent Application No. 201810222648.1 filed on Mar. 19, 2018. The contents of the above applications are all incorporated by reference as if fully set forth herein in their entirety.

FIELD AND BACKGROUND OF THE INVENTION

The present invention relates to liquid crystal displaying, and particularly to a low temperature poly-silicon (LTPS) display panel and a liquid crystal display device.

Low temperature poly-silicon (LTPS) display panels are widely used in smart mobile phones or tablets. IPHONE 8 mobile phones, HUAWEI Mate 9 mobile phones, and HUAWEI M3 tablets all are LTPS panel based products. Large-sized array substrates and large-sized color filter (CF) substrates are laminated together during LTPS manufacturing processes to be assembled into thin film transistor (TFT) cases. The assembled array substrates and CF substrates are divided by cutting into separate pieces of LTPS panels. The process of cutting tends to cause remarkable deformation of the array substrates on edge portions of plastic frames (the plastic frames are not easily to deform because of greater rigidity). Inorganic dielectric layers of surfaces of the array substrates tend to cause cracks occur thereon because of the higher degree of deformation of themselves and limited tenacity.

Therefore, it is imperative to solve deficiencies in current techniques.

SUMMARY OF THE INVENTION

An object of the present invention is to provide a low temperature poly-silicon (LTPS) display panel and a liquid crystal display device to prevent cracks from occurring in cutting processes.

To achieve the above-mentioned object, the LTPS display panel of the present invention includes a color filter substrate, an array substrate, and a frame sealing glue, the array substrate and the color filter substrate cell-assembled through the frame sealing glue, and the array substrate comprises:
a glass substrate;
a functional structure layer disposed on the glass substrate;
a third inorganic dielectric layer disposed on the functional structure layer, the third inorganic dielectric layer connected with the frame sealing glue, at least a row of first anti-crack holes formed on the third inorganic dielectric layer adjacent to the frame sealing glue, each said row of first anti-crack holes comprising a plurality of the first anti-crack holes arranged in a direction along and in parallel with the frame sealing glue; and
wherein the functional structure layer comprises:
a first inorganic dielectric layer disposed on the glass substrate;
a source/drain metal layer disposed on the first inorganic dielectric layer;
a planar layer disposed on the first inorganic dielectric layer and the source/drain metal layer;
a second inorganic dielectric layer disposed on the planar layer;
a touch control electrode metal layer disposed on the second inorganic dielectric layer;
the third inorganic dielectric layer disposed on the second inorganic dielectric layer and the touch control electrode metal layer; and
each of the first anti-crack holes has a rectangular shape, and each of the first anti-crack holes being coaxial with an arranged direction of each said row of first anti-crack holes in a longitudinal direction.

In the LTPS display panel of the present invention, at least a row of second anti-crack holes are openly formed on the second inorganic dielectric layer, each said row of second anti-crack holes comprise a plurality of the second anti-crack holes arranged in a direction along and in parallel with the frame sealing glue, and each of the first anti-crack holes corresponds to position and cross-sectional size of each of the second anti-crack holes.

In the LTPS display panel of the present invention, at least a raw of third anti-crack holes are openly formed on the planar layer, each said raw of third anti-crack holes comprise a plurality of the third anti-crack holes arranged in a direction along and in parallel with the frame sealing glue, and each of the third anti-crack holes corresponds to each of the second anti-crack holes.

In the LTPS display panel of the present invention, the third anti-crack holes decrease progressively in width in a direction far away from the second anti-crack holes.

In the LTPS display panel of the present invention, depth of the third anti-crack holes is less than a thickness of the planar layer.

In the LTPS display panel of the present invention, a number of the at least a row of first anti-crack holes is two, and the two rows of the first anti-crack holes are mutually staggered.

In the LTPS display panel of the present invention, the first inorganic dielectric layer is exemplified by a silicon dioxide dielectric layer.

The present invention further provides a low temperature poly-silicon (LTPS) display panel, including a color filter substrate, an array substrate, and a frame sealing glue, the array substrate and the color filter substrate connected cell-assembled through the frame sealing glue, and the array substrate comprising:
a glass substrate;
a functional structure layer disposed on the glass substrate; and
a third inorganic dielectric layer disposed on the functional structure layer, the third inorganic dielectric layer connected with the frame sealing glue, at least a row of first anti-crack holes formed on the third inorganic dielectric layer adjacent to the frame sealing glue, each said row of first anti-crack holes comprising a plurality of the first anti-crack holes arranged in a direction along and in parallel with the frame sealing glue.

In the LTPS display panel of the present invention, the functional structure layer comprises:
a first inorganic dielectric layer disposed on the glass substrate;
a source/drain metal layer disposed on the first inorganic dielectric layer;
a planar layer disposed on the first inorganic dielectric layer and the source/drain metal layer;
a second inorganic dielectric layer disposed on the planar layer;

a touch control electrode metal layer disposed on the second inorganic dielectric layer; and the third inorganic dielectric layer disposed on the second inorganic dielectric layer and the touch control electrode metal layer.

In the LTPS display panel of the present invention, at least a row of second anti-crack holes are openly formed on the second inorganic dielectric layer, each said row of second anti-crack holes comprise a plurality of the second anti-crack holes arranged in a direction along and in parallel with the frame sealing glue, and each of the first anti-crack holes corresponds to position and cross-sectional size of each of the second anti-crack holes.

In the LTPS display panel of the present invention, at least a raw of third anti-crack holes are openly formed on the planar layer, each said raw of third anti-crack holes comprise a plurality of the third anti-crack holes arranged in a direction along and in parallel with the frame sealing glue, and each of the third anti-crack holes corresponds to each of the second anti-crack holes.

In the LTPS display panel of the present invention, the third anti-crack holes decrease progressively in width in a direction far away from the second anti-crack holes.

In the LTPS display panel of the present invention, depth of the third anti-crack holes is less than a thickness of the planar layer.

In the LTPS display panel of the present invention, each of the first anti-crack holes has a rectangular shape, and each of the first anti-crack holes is coaxial with an arranged direction of each said row of first anti-crack holes in a longitudinal direction.

In the LTPS display panel of the present invention, a number of the at least a row of first anti-crack holes is two, and the two rows of the first anti-crack holes are mutually staggered.

In the LTPS display panel of the present invention, the first inorganic dielectric layer is exemplified by a silicon dioxide dielectric layer.

The present invention further provides a liquid crystal display device, including a low temperature poly-silicon (LTPS) display panel comprising a color filter substrate, an array substrate, and a frame sealing glue, the array substrate and the color filter substrate connected cell-assembled through the frame sealing glue, and the array substrate comprising:

a glass substrate;

a functional structure layer disposed on the glass substrate; and a third inorganic dielectric layer disposed on the functional structure layer, the third inorganic dielectric layer connected with the frame sealing glue, at least a row of first anti-crack holes formed on the third inorganic dielectric layer adjacent to the frame sealing glue, each said row of first anti-crack holes comprising a plurality of the first anti-crack holes arranged in a direction along and in parallel with the frame sealing glue.

In the liquid crystal display device of the present invention, the functional structure layer comprises:

a first inorganic dielectric layer disposed on the glass substrate;

a source/drain metal layer disposed on the first inorganic dielectric layer;

a planar layer disposed on the first inorganic dielectric layer and the source/drain metal layer;

a second inorganic dielectric layer disposed on the planar layer;

a touch control electrode metal layer disposed on the second inorganic dielectric layer; and the third inorganic dielectric layer disposed on the second inorganic dielectric layer and the touch control electrode metal layer.

In the liquid crystal display device of the present invention, at least a row of second anti-crack holes are openly formed on the second inorganic dielectric layer, each said row of second anti-crack holes comprise a plurality of the second anti-crack holes arranged in a direction along and in parallel with the frame sealing glue, and each of the first anti-crack holes corresponds to position and cross-sectional size of each of the second anti-crack holes.

In the liquid crystal display device of the present invention, at least a raw of third anti-crack holes are openly formed on the planar layer, each said raw of third anti-crack holes comprise a plurality of the third anti-crack holes arranged in a direction along and in parallel with the frame sealing glue, and each of the third anti-crack holes corresponds to each of the second anti-crack holes.

The present invention utilizes the plurality of the first anti-crack holes openly formed on the first inorganic dielectric layer adjacent to the frame sealing glue to prevent cracks from being generated by cutting processes.

DESCRIPTION OF SPECIFIC EMBODIMENTS OF THE INVENTION

Figure 1:
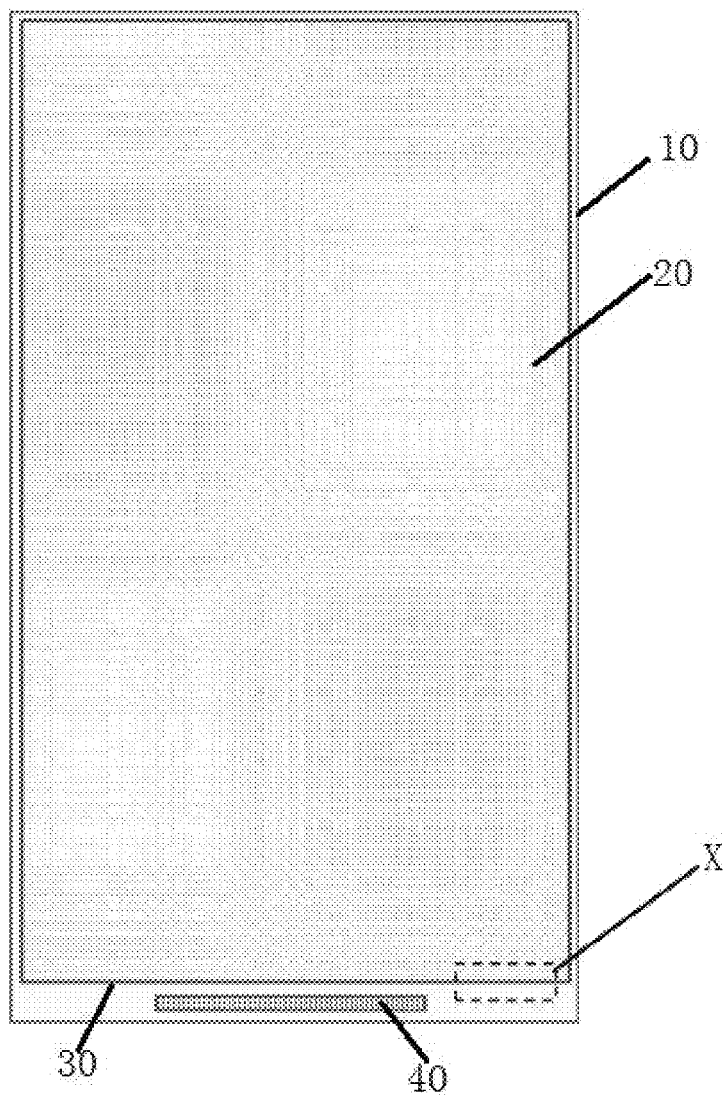
FIG. 1 is a schematic structural view of a low temperature poly-silicon (LTPS) display panel in accordance with an embodiment of the present invention.
Figure 2:
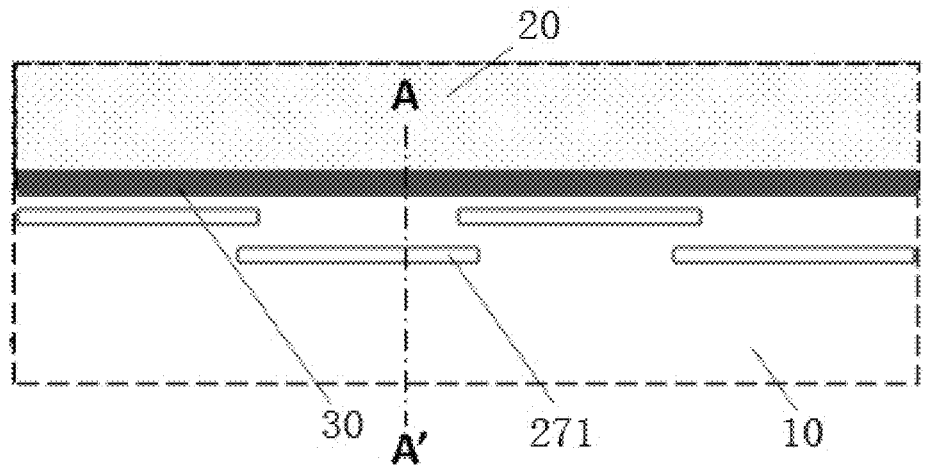
FIG. 2 is an enlarged schematic structural view of an annotated portion X in FIG. 1.
Figure 3:
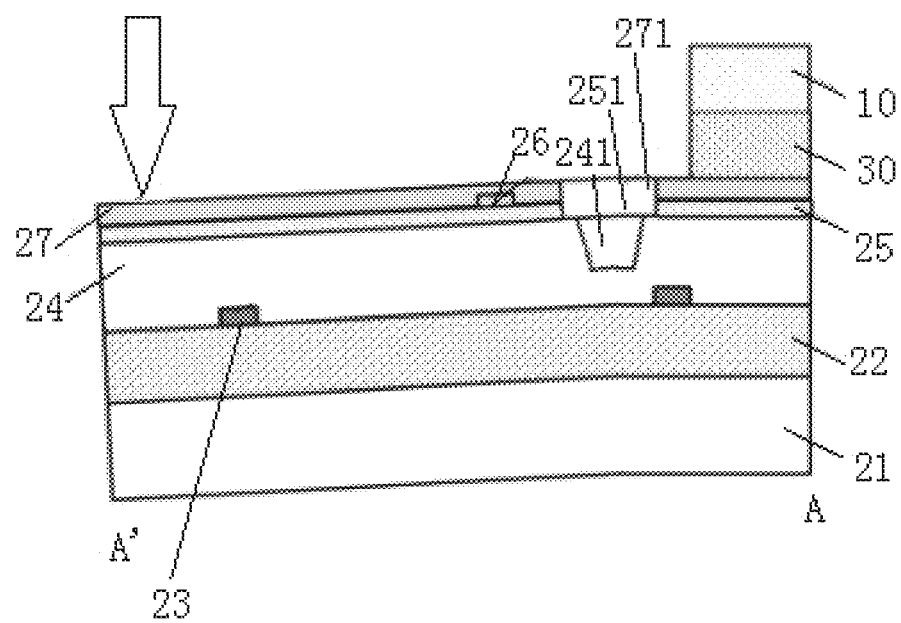
FIG. 3 is a schematic structural view of the LTPS display panel in accordance with another embodiment of the present invention.

The drawings and description are to be regarded as illustrative in nature and not restrictive. Like reference numerals designate like elements throughout the specification. The following embodiments are referring to the accompanying drawings for exemplifying specific implementable embodiments of the present invention, but the present invention is not limited thereto.

In the description of the present invention, it is to be understood that the term "center", "longitudinal", "lateral", "length", "width", "thickness", "upper", "lower", "front", "rear", "left", "right", "vertical", "horizontal", "top", "bottom", "inner", "outer", "clockwise", "counterclockwise" and the like indicates orientation or the orientation or positional relationship based on the positional relationship shown in the drawings, for convenience of description only and the present invention is to simplify the description, but does not indicate or imply that the device or element referred to must have a particular orientation in a particular orientation construction and operation, and therefore not be construed as limiting the present invention.

In the present invention, unless otherwise explicitly specified or limited, the terms "mounted", "connected", "connected", "fixed" and like terms are to be broadly understood, for example, may be a fixed connection, may be is detachably connected to, or integrally; may be a mechanical connector, may be electrically connected; may be directly connected, can also be connected indirectly through intervening structures, it may be interaction between the two internal communicating elements or two elements. Those of ordinary skill in the art, to be understood that the specific meanings in the present invention in accordance with specific circumstances.

In the present invention, unless otherwise expressly specified or limited, the first feature in the "on" a second "lower" or the first and second features may include direct contact and may also include a first the second feature is not in direct contact, but the contact by the additional features therebetween. Also, the first feature a second feature in the "on", "above", "upper" and includes obliquely upward directly above first feature a second feature, or only represents a first characteristic level is higher than the height of the second feature. In the first feature a second feature "beneath", "below" and "lower" feature includes a first and obliquely downward right below the second feature, or just less than the level represented by the first feature a second feature.

Hereafter, embodiments of the present invention will be described in detail with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

Please refer to FIG. 1 showing a schematic structural view of a low temperature poly-silicon (LTPS) display panel in accordance with an embodiment of the present invention. The LTPS display panel comprises a color filter substrate 10, an array substrate 20, and a frame sealing glue 30. The array substrate 20 and the color filter substrate 10 are cell-assembled through the frame sealing glue 30, and a liquid crystal layer (not shown) is disposed between the color filter substrate 10 and the array substrate 20. The color filter substrate 10 and the array substrate 20 have a substantially rectangular shape or a rectangular shape with round corners.

Viewing in a horizontal direction, the array substrate 20 comprises a first area and a second area connected with the first area. Both the first area and the second area have a rectangular shape. One end of the frame sealing glue 30 connects with an edge of the first area, and another end of the frame sealing glue 30 connects with the color filter substrate 10. The first area corresponds to the color filter substrate 10. The second area is provided with a control chip 40. The control chip 40 is utilized to drive an active layer of the array substrate 20.

Viewing in a vertical direction, the array substrate 20 comprises a glass substrate 21, a functional structure layer, and a third inorganic dielectric layer 27. The functional structure layer is disposed on the glass substrate. The third inorganic dielectric layer 27 is disposed on the functional structure layer.

The functional structure layer comprises a first inorganic dielectric layer 22, a source/drain metal layer 23, a planner layer 24, a second inorganic dielectric layer 25, a touch control electrode metal layer 26, and the third inorganic dielectric layer 27.

The first inorganic dielectric layer 22 is disposed on the glass substrate 21. The first inorganic dielectric layer 22 can be exemplified by a silicon dioxide dielectric layer but is not limited thereby. The first inorganic dielectric layer 22 is deposited through chemical vapor deposition.

The source/drain metal layer 23 is disposed on the first inorganic dielectric layer 22. The source/drain metal layer 23 comprises source electrodes and drain electrodes. The source/drain metal layer 23 is deposited with a metal material on the first inorganic dielectric layer 22 through chemical vapor deposition, and then is formed by patterning processes.

The planar layer 24 is an organic planar layer. The planar layer 24 is disposed on the first inorganic dielectric layer 22 and the source/drain metal layer 23.

The second inorganic dielectric layer 25 can be exemplified by a silicon nitride dielectric layer. The second inorganic dielectric layer 25 is deposited on the planar layer 24 through chemical vapor deposition.

The touch control electrode metal layer 26 is utilized to form a touch electric field and generate a corresponding induction signal upon users' fingers touch, thereby to fulfill touch control function. The touch control electrode metal layer 26 is disposed on the second inorganic dielectric layer 25, but location of the touch control electrode metal layer 26 is not limited thereby and is variable according to actual practice.

The third inorganic dielectric layer 27 can be exemplified by a silicon nitride dielectric layer. The third inorganic dielectric layer 27 is deposed on the second inorganic dielectric layer 25 and the touch control electrode metal layer 26. The third inorganic dielectric layer 27 is deposited on the second inorganic dielectric layer 25 and the touch control electrode metal layer 26 through chemical vapor deposition. The third inorganic dielectric layer 27 connects with the frame sealing glue 30.

At least a row of first anti-crack holes 271 are formed on the third inorganic dielectric layer 27 adjacent to the frame sealing glue 30. Each said row of first anti-crack holes 271 comprises a plurality of the first anti-crack holes 271 arranged in a direction along and in parallel with the frame sealing glue 30.

In one embodiment, each of the first anti-crack holes 271 has a rectangular shape, and each of the first anti-crack holes 271 is coaxial with an arranged direction of each said row of first anti-crack holes 271 in a longitudinal direction.

In one embodiment, a number of the at least a row of first anti-crack holes 271 is two, and the two rows of the first anti-crack holes 271 are mutually staggered.

In one embodiment, at least a row of second anti-crack holes 251 are openly formed on the second inorganic dielectric layer 25. Each said row of second anti-crack holes 251 comprise a plurality of the second anti-crack holes 251 arranged in a direction along and in parallel with the frame sealing glue 30, wherein each of the first anti-crack holes 271 corresponds to position and cross-sectional size of each of the second anti-crack holes 251.

In one embodiment, at least a raw of third anti-crack holes 241 are openly formed on the planar layer 24. Each said raw of third anti-crack holes 241 comprise a plurality of the third anti-crack holes 241 arranged in a direction along and in parallel with the frame sealing glue 30. Each of the third anti-crack holes 241 corresponds to each of the second anti-crack holes 251.

The third anti-crack holes 241 decrease progressively in width in a direction far away from the second anti-crack holes 251.

A depth of the third anti-crack holes 241 is less than a thickness of the planar layer 24. In the present embodiment, the depth of the third anti-crack holes 241 is two-thirds of the thickness of the planar layer 24.

The first anti-crack holes 271, the second anti-crack holes 251, and the third anti-crack holes 241 are disposed on the second area of the array substrate 20.

When the array substrate is under stress, portions provided with anti-crack holes are more easily to deform because a total thickness of layers is thinner, which results in less deformation on inorganic dielectric layers on a surface of the array substrate with respect to areas surrounding the anti-crack holes, thereby to prevent the inorganic dielectric layers from generating cracks by cutting processes.

The present invention further provides a liquid crystal display device, comprising a backlight module and the LTPS display panel. The LTPS display panel is disposed on the backlight module.

The LTPS display panel comprises the color filter substrate 10, the array substrate 20, and the frame sealing glue 30. The array substrate 20 and the color filter substrate 10 are cell-assembled through the frame sealing glue 30, and a liquid crystal layer (not shown) is disposed between the color filter substrate 10 and the array substrate 20.

Viewing in a horizontal direction, the array substrate 20 comprises a first area and a second area connected with the first area. Both the first area and the second area have a rectangular shape. One end of the frame sealing glue 30 connects with an edge of the first area, and another end of the frame sealing glue 30 connects with the color filter substrate 10. The first area corresponds to the color filter substrate 10. The second area is provided with a control chip 40. The control chip 40 is utilized to drive an active layer of the array substrate 20.

Viewing in a vertical direction, the array substrate 20 comprises the glass substrate 21, the first inorganic dielectric layer 22, the source/drain metal layer 23, the planar layer 24, the second inorganic dielectric layer 25, the touch control electrode metal layer 26, and the third inorganic dielectric layer 27.

The first inorganic dielectric layer 22 is disposed on the glass substrate 21. The first inorganic dielectric layer 22 can be exemplified by a silicon dioxide dielectric layer but is not limited thereby. The first inorganic dielectric layer 22 is deposited through chemical vapor deposition.

The source/drain metal layer 23 is disposed on the first inorganic dielectric layer 22. The source/drain metal layer 23 comprises source electrodes and drain electrodes. The source/drain metal layer 23 is deposited with a metal material on the first inorganic dielectric layer 22 through chemical vapor deposition, and then is formed by patterning processes.

The planar layer 24 is an organic planar layer. The planar layer 24 is disposed on the first inorganic dielectric layer 22 and the source/drain metal layer 23.

The second inorganic dielectric layer 25 can be exemplified by a silicon nitride dielectric layer. The second inorganic dielectric layer 25 is deposited on the planar layer 24 through chemical vapor deposition.

The touch control electrode metal layer 26 is utilized to form a touch electric field and generate a corresponding induction signal upon users' fingers touch, thereby to fulfill touch control function. The touch control electrode metal layer 26 is disposed on the second inorganic dielectric layer 25.

The third inorganic dielectric layer 27 can be exemplified by a silicon nitride dielectric layer. The third inorganic dielectric layer 27 is deposed on the second inorganic dielectric layer 25 and the touch control electrode metal layer 26. The third inorganic dielectric layer 27 is deposited on the second inorganic dielectric layer 25 and the touch control electrode metal layer 26 through chemical vapor deposition. The third inorganic dielectric layer 27 connects with the frame sealing glue 30.

At least a row of first anti-crack holes 271 are formed on the third inorganic dielectric layer 27 adjacent to the frame sealing glue 30. Each said row of first anti-crack holes 271 comprises a plurality of the first anti-crack holes 271 arranged in a direction along and in parallel with the frame sealing glue 30.

In one embodiment, each of the first anti-crack holes 271 has a rectangular shape, and each of the first anti-crack holes 271 is coaxial with an arranged direction of each said row of first anti-crack holes 271 in a longitudinal direction.

In one embodiment, a number of the at least a row of first anti-crack holes 271 is two, and the two rows of the first anti-crack holes 271 are mutually staggered.

In one embodiment, at least a row of second anti-crack holes 251 are openly formed on the second inorganic dielectric layer 25. Each said row of second anti-crack holes 251 comprise a plurality of the second anti-crack holes 251 arranged in a direction along and in parallel with the frame sealing glue 30, wherein each of the first anti-crack holes 271 corresponds to position and cross-sectional size of each of the second anti-crack holes 251.

In one embodiment, at least a raw of third anti-crack holes 241 are openly formed on the planar layer 24. Each said raw of third anti-crack holes 241 comprise a plurality of the third anti-crack holes 241 arranged in a direction along and in parallel with the frame sealing glue 30. Each of the third anti-crack holes 241 corresponds to each of the second anti-crack holes 251.

The third anti-crack holes 241 decrease progressively in width in a direction far away from the second anti-crack holes 251.

A depth of the third anti-crack holes 241 is less than a thickness of the planar layer 24. In the present embodiment, the depth of the third anti-crack holes 241 is two-thirds of the thickness of the planar layer 24.

The first anti-crack holes 271, the second anti-crack holes 251, and the third anti-crack holes 241 are disposed on the second area of the array substrate 20.

When the array substrate is under stress, portions provided with anti-crack holes are more easily to deform because a total thickness of layers is thinner, which results in less deformation on inorganic dielectric layers on a surface of the array substrate with respect to areas surrounding the anti-crack holes, thereby to prevent the inorganic dielectric layers from generating cracks by cutting processes.

It is understood that the invention may be embodied in other forms within the scope of the claims. Thus the present examples and embodiments are to be considered in all respects as illustrative, and not restrictive, of the invention defined by the claims.

What is claimed is:

1. A low temperature poly-silicon (LTPS) display panel, including:
   a color filter substrate, an array substrate, and a frame sealing glue, the array substrate and the color filter substrate cell-assembled through the frame sealing glue, and the array substrate comprising:
   a glass substrate;
   a functional structure layer disposed on the glass substrate;
   wherein the functional structure layer comprises:
   a first inorganic dielectric layer disposed on the glass substrate;

a source/drain metal layer disposed on the first inorganic dielectric layer;

a planar layer disposed on the first inorganic dielectric layer and the source/drain metal layer;

a second inorganic dielectric layer disposed on the planar layer;

a touch control electrode metal layer disposed on the second inorganic dielectric layer; and a third inorganic dielectric layer disposed on the second inorganic dielectric layer and the touch control electrode metal layer, and the third inorganic dielectric layer connected with the frame sealing glue;

wherein at least a row of first anti-crack holes are formed in the third inorganic dielectric layer adjacent to the frame sealing glue, each said row of first anti-crack holes comprise a plurality of the first anti-crack holes arranged in a direction along and in parallel with the frame sealing glue, each of the first anti-crack holes has a rectangular shape and is coaxial with an arranged direction of each said row of first anti-crack holes in a longitudinal direction;

wherein a number of the at least a row of first anti-crack holes is two, and the two rows of the first anti-crack holes are mutually staggered.

2. The LTPS display panel of claim 1, wherein at least a row of second anti-crack holes are formed in the second inorganic dielectric layer, each said row of second anti-crack holes comprise a plurality of the second anti-crack holes arranged in a direction along and in parallel with the frame sealing glue, and each of the first anti-crack holes corresponds to position and cross-sectional size of each of the second anti-crack holes.

3. The LTPS display panel of claim 2, wherein the first inorganic dielectric layer is a silicon dioxide dielectric layer.

4. The LTPS display panel of claim 2, wherein at least a row of third anti-crack holes are formed in the planar layer, each said row of third anti-crack holes comprise a plurality of the third anti-crack holes arranged in a direction along and in parallel with the frame sealing glue, and each of the third anti-crack holes corresponds to each of the second anti-crack holes.

5. The LTPS display panel of claim 4, wherein the third anti-crack holes decrease progressively in width in a direction away from the second anti-crack holes.

6. The LTPS display panel of claim 5, wherein a depth of the third anti-crack holes is less than a thickness of the planar layer.

7. A low temperature poly-silicon (LTPS) display panel, including:

a color filter substrate, an array substrate, and a frame sealing glue, the array substrate and the color filter substrate cell-assembled through the frame sealing glue, and the array substrate comprising:

a glass substrate; and a functional structure layer disposed on the glass substrate;

wherein the functional structure layer comprises:

a first inorganic dielectric layer disposed on the glass substrate;

a source/drain metal layer disposed on the first inorganic dielectric layer;

a planar layer disposed on the first inorganic dielectric layer and the source/drain metal layer;

a second inorganic dielectric layer disposed on the planar layer;

a touch control electrode metal layer disposed on the second inorganic dielectric layer; and a third inorganic dielectric layer disposed on the second inorganic dielectric layer and the touch control electrode metal layer, the third inorganic dielectric layer connected with the frame sealing glue, at least a row of first anti-crack holes formed in the third inorganic dielectric layer adjacent to the frame sealing glue, each said row of first anti-crack holes comprising a plurality of the first anti-crack holes arranged in a direction along and in parallel with the frame sealing glue;

wherein at least a row of second anti-crack holes are formed in the second inorganic dielectric layer, each said row of second anti-crack holes comprise a plurality of the second anti-crack holes arranged in a direction along and in parallel with the frame sealing glue, and each of the first anti-crack holes corresponds to position and cross-sectional size of each of the second anti-crack holes;

wherein at least a row of third anti-crack holes are formed in the planar layer, each said row of third anti-crack holes comprise a plurality of the third anti-crack holes arranged in a direction along and in parallel with the frame sealing glue, and each of the third anti-crack holes corresponds to each of the second anti-crack holes;

wherein the third anti-crack holes decrease progressively in width in a direction away from the second anti-crack holes, and a depth of the third anti-crack holes is less than a thickness of the planar layer.

8. The LTPS display panel of claim 7, wherein the first inorganic dielectric layer is a silicon dioxide dielectric layer.

9. The LTPS display panel of claim 7, wherein each of the first anti-crack holes has a rectangular shape and is coaxial with an arranged direction of each said row of first anti-crack holes in a longitudinal direction.

10. The LTPS display panel of claim 9, a number of the at least a row of first anti-crack holes is two, and the two rows of the first anti-crack holes are mutually staggered.

* * * * *